No. 819,591. PATENTED MAY 1, 1906.
H. C. PERCY.
RANGE FINDER.
APPLICATION FILED JUNE 21, 1905.

WITNESSES:

INVENTOR
HARRY C. PERCY.
BY
ATTORNEYS

UNITED STATES PATENT OFFICE.

HARRY C. PERCY, OF NATCHITOCHES, LOUISIANA.

RANGE-FINDER.

No. 819,591.　　　Specification of Letters Patent.　　　Patented May 1, 1906.

Application filed June 21, 1905. Serial No. 266,238.

*To all whom it may concern:*

Be it known that I, HARRY C. PERCY, a citizen of the United States, and a resident of Natchitoches, in the parish of Natchitoches and State of Louisiana, have invented certain new and useful Improvements in Range-Finders, of which the following is a specification.

My invention is an improvement in range-finders; and it consists in certain novel constructions and combinations of parts hereinafter described and claimed.

Figure 1:
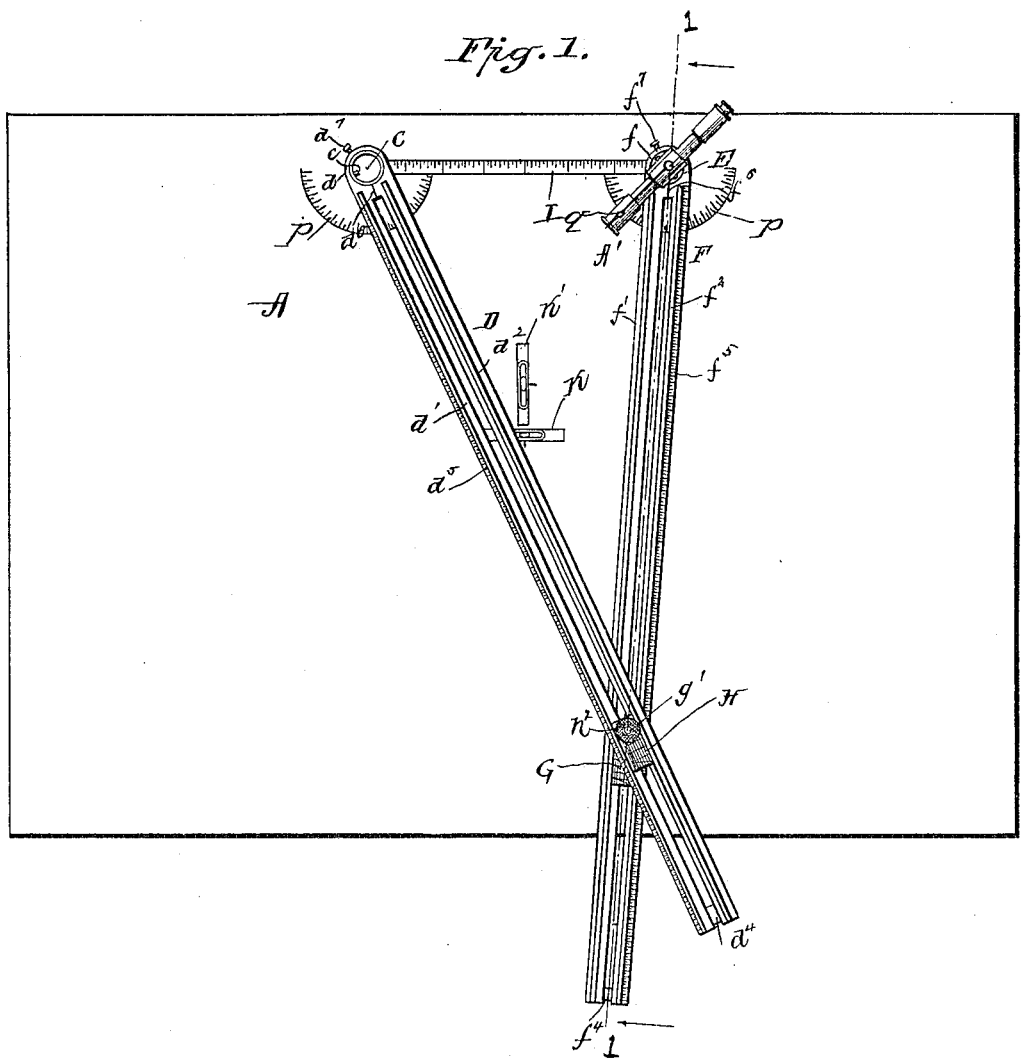
Figure 2:
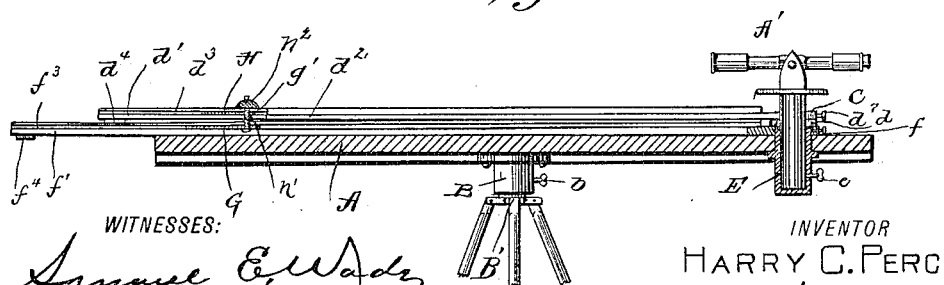

Referring to the drawings forming a part hereof, Figure 1 is a plan view of my invention. Fig. 2 is a transverse section on the line 1 1 of Fig. 1.

In the practical application of my invention, I provide a table A of suitable size, having secured to the lower face thereof a socket B to receive a Jacob's-staff or tripod head B' and having a set-screw $b$ to secure the staff or tripod in place. A socket C is arranged within an opening in the table adjacent to one edge thereof, and a second socket E is arranged within an opening in the table which is a suitable distance from the first socket, both sockets being in a straight line parallel with the edge of the table. The sockets C and E are for receiving and rotatably supporting a telescope A', which is secured in place in the sockets C and E by set-screws $c$ and $e$, respectively.

A bar D, comprising the parallel pieces $d'$ $d^2$, each provided with an inwardly-facing groove $d^3$ and secured at their outer ends by a cross-piece $d^4$, is revolubly mounted around the socket C by means of a ring $d$, encircling the socket and secured to the inner ends of the parallel pieces. The ring is provided with a set-screw $d^7$ for fixing the bar with respect to the socket, and the outer half of the bar is provided with a scale $d^5$, a sighting-line $d^6$ being arranged on the ring centrally between the two parallel pieces. A second bar F, comprising the parallel pieces $f'$ $f^2$, each provided with an inwardly-facing groove $f^3$ and secured at their outer ends by the cross-piece $f^4$, is revolubly mounted around the socket by means of the ring $f$, encircling the socket and secured to the inner ends of the parallel pieces. A set-screw $f^7$, traversing the ring, is provided for fixing the bar with respect to the socket, and the outer member of the parallel pieces is provided with a scale $f^5$, a sight $f^6$ being arranged on the ring centrally between the parallel pieces.

A slide G is arranged within the grooves of the bar F and is provided with an upwardly-projecting-pin $g'$, traversing a perforation $h'$ in a slide H, arranged within the grooves of the bar D. The end of the pin $g'$ is screw-threaded and is engaged by a nut $h^2$ for fixing the bars with respect to each other. A vernier is arranged on the outer edges of each of the slides G and H for coöperating with the scales $d^5$ and $f^5$, and between the center of the sockets C and E is arranged a graduated base-line I.

In the upper face of the table and flush with the surface thereof are arranged spirit-levels K K', the level K longitudinally of the table and the level K' transversely thereof.

In operation the table is placed upon the Jacob's-staff or tripod and leveled, and the telescope is placed in one of the sockets— say, for instance, D—and sighted along the base-line. The table is then turned upon the Jacob's-staff until the base-line of the table is in line with the telescope, when the table is clamped into place. The telescope is then turned and sighted on the object whose distance is to be measured. The bar D, corresponding to the socket C, is moved along the surface of the table until the sight corresponds with the sight of the telescope. By means of the set-screw $c$ the bar D is clamped in the socket C. The telescope is then removed and placed in the socket E, and the table is removed to the other end of the measured base-line. The base-line of the table is again brought into coincidence with the measured base-line, after which the table is again clamped to the Jacob's-staff or tripod. The telescope is then sighted a second time on the object whose distance is to be measured, and the bar F, the set-screws of the slides being loosened, is moved along the bar D until it coincides with the line of the telescope, when the set-screw is turned, fixing the bars with respect to each other. It will be evident that the sides of the imaginary triangle will be proportionate to the sides of the triangle of the table and that the base of the table-triangle will be to the measured base-line as the sides of the table-triangle are to the distance of the object from the ends of the measured base-line.

It will be understood that the distance between the tripod-socket and the telescope-sockets must be taken into consideration when placing the table at the ends of the measured base-line. By the provision of verniers a much closer reading may be obtained than by the use of indicators.

In Fig. 1 it will be seen that a protractor P is arranged on the face of the table with the socket of the telescope for its center and on the telescope is an indicator Q or a vernier, as may be desired. The above is for convenience in sighting more than one object without moving the tripod, whereby a plurality of measurements may be made with one base-line and without moving the tripod more than one time.

Having thus described my invention, what I claim as new, and desire to secure by Letters Patent, is—

1. A range-finder comprising a table, a socket secured beneath the table and provided with a set-screw, a socket on the upper face of the table at one side thereof, and provided with a set-screw, a graduated bar revolubly mounted around the socket, and provided on its upper face with oppositely-disposed grooves, a set-screw on the bar for engaging the socket, a second socket in the upper face of the table at the same side as the first socket and spaced apart therefrom, a set-screw engaging the side of the socket, a graduated bar revolubly mounted around the socket and provided on its upper face with oppositely-disposed grooves, a set-screw in the bar for engaging a socket, a graduated base-line on the table between the sockets, means for movably connecting the bars comprising a slide movable within the groove of the first bar and provided on its upper face with a vernier, a screw-threaded pin projecting upwardly from the slide, a second slide movable within the grooves of the second bar and provided on its upper face with a vernier and with an opening to engage the pin, a thumb-nut engaging the pin, and spirit-levels arranged in the upper face of the table in a direction corresponding with its length and breadth.

2. A range-finder comprising a table, means for supporting the table, means for determining the level of the table, a socket in the upper face of the table at one side thereof, and provided with a set-screw, a graduated bar revolubly mounted around the socket and provided on its upper face with oppositely-disposed grooves, a set-screw on the bar for engaging the socket, a second socket on the upper face of the table on the same side as the first socket and spaced apart therefrom, a set-screw engaging the side of the socket, a graduated bar revolubly mounted around the socket, and provided on its upper face with oppositely-disposed grooves, means for fixing the bar with relation to the socket, the table having a graduated base-line between the sockets, means for movably connecting the bars comprising a slide movable within the grooves of the first bar, a second slide movable within the grooves of the second bar, and means for securing the slides whereby they may rotate upon each other.

3. A range-finder comprising a table, means for supporting the table, means for determining the level of the table, means for supporting a telescope at one side of the table, a graduated bar revolubly mounted around said supporting means, a second telescope-supporting means on the table at the same side as the first supporting means and spaced apart therefrom, a graduated bar revolubly mounted around the second telescope-supporting means, the table having a graduated base-line between the telescope-supporting means, means for connecting the bars together whereby they may slide upon each other, comprising a slide movable on the first bar, a slide movable on the second bar, means for securing the slides together whereby they may rotate upon each other and means for fixing the bars with respect to each other and to the base-line.

4. In range-finders, the combination of a table, means for supporting the table, means for determining the level of the table, a triangular frame mounted on the table and having a fixed graduated base-line, and movable graduated side lines pivoted to the ends of the base-line, means at the ends of the base-lines for supporting a telescope, means for fixing the respective side lines with respect to the telescope-supporting means, and the base-line, means for fixing the side lines with respect to each other, and said last-named means being provided with verniers for coacting with the graduations on the side lines.

HARRY C. PERCY.

Witnesses:
ANGUS FLEMING,
RICHARD PERCY.